United States Patent [19]
Noel

[11] Patent Number: 5,570,176
[45] Date of Patent: Oct. 29, 1996

[54] APPARATUS FOR CONVERTING A MULTIMETER TO AN OPTICAL POWER METER

[75] Inventor: Claude A. Noel, Quebec, Canada

[73] Assignee: Nortech Fibronic Inc., Quebec, Canada

[21] Appl. No.: 387,164

[22] Filed: Feb. 13, 1995

[51] Int. Cl.[6] .................................................. G01N 21/84
[52] U.S. Cl. ............................................................ 356/73.1
[58] Field of Search .............................. 356/73.1; 385/22

[56] References Cited

U.S. PATENT DOCUMENTS

| | | | |
|---|---|---|---|
| 4,799,787 | 1/1989 | Mason | 356/44 X |
| 5,196,899 | 3/1993 | Serwatka | 356/73.1 |

OTHER PUBLICATIONS

Wendland et al, "A Decibel Measuring Instrument for Fiber Optics", Conference Electro–Optics/Laser International 80UK Brigton England (25–27 Mar. 1980). pp. 31–7.
Fotec Inc., Fiber Optic Converters, data sheets Biccotest Limited, T460, T470, T480, data sheets.
Rifocs Corporation, 550A series, data sheet Hewlett Packard, HP8140A, data sheets.

*Primary Examiner*—Vincent P. McGraw

[57] ABSTRACT

An apparatus to convert optical power into a voltage includes a wavelength selector switch and can plug itself into any multi-meter. The converter apparatus comprises an annular connector which adapts onto any type of optical fiber connectors which may be of various diameters. A photo-diode at the receiving end is large enough so as not to require that the optical fiber be at a 90° angle to the photo-diode surface at any time, so the surface gets the best possible reading. A switch on the converter housing allows to calibrate instantly the converter at the right wavelength used for the test. The optical power is then converted and sent as a voltage value through a pair of banana plugs that can be affixed to any multi-meter. A battery within the housing provides the power to the converter so no external power source is needed. The converter allows the use of a low price multi-meter rather than needing a converter particularly built for this application.

10 Claims, 7 Drawing Sheets

5,570,176

APPARATUS FOR CONVERTING A MULTIMETER TO AN OPTICAL POWER METER

BACKGROUND—FIELD OF THE INVENTION

This invention relates to the conversion of optical power in an optical fiber, more particularly the conversion of optical power into a voltage that can be read on a volt-meter or other apparatus capable of measuring this value.

BACKGROUND—DESCRIPTION OF THE PRIOR ART

Fibre Optic technology has followed a learning curve over the recent years which has resulted in expanded use in many applications, especially in telecommunication. Fibre optic test instruments are used to characterize the quality of fibre optic links and some applications require the optical power to be measured on an optical fiber, whether in a lab for an experiment or in the telecommunication field. Several other inventions provide some way of converting the proposed measurements but do not provide the degree of versatility that the present invention provides, which will become apparent as further explained. The known systems tend to be, on one side, completely autonomous and are called power-meters. Not everybody can buy these systems first because they are expensive and also because they are built specifically for this use and cannot be used for another task. The RIFOCS Company possesses a system that receives a signal, converts it to a voltage and displays it. It is expensive it incorporates a keyboard, a display and a data acquisition system all in one apparatus.

The BICCOTEST Company has a series of power-meters that perform the same task as the above mentionned RIFOCS Company system and has the same basic components. This system, again with its specification to one task, is expensive and can only be used with a system of the same kind, namely of the same company. The HP Company presents a system that can be filed under the RIFOCS and BICCOTEST category regarding its power measuring function. It is still an expensive instrument and can only be used to measure optical power and optical power loss and is not intended to transform a voltmeter into an optical power meter.

Unlike the products mentionned above, my invention is designed to allow the use of an ordinary multi-meter to do the same task, therefore cutting down the price of such system and the number of apparatus needed for a number of tests because the multi-meter can be used for more than one type of test or application. The FOTEC Company possesses a similar system that resembles the present invention and has a wavelength selector dial to select a suitable predetermined wavelength value that is not as quick and not as risk free as ours. It has connecting wires instead of banana plugs, so the connection tends to be less convenient and makes it less suitable for field use; it needs an external wire adaptor to connect the system to the meter that will measure a voltage value; it is also big and clumsy. This translates itself by a difficulty and hassle of operating such a system for this type of work.

OBJECTS AND ADVANTAGES

Accordingly, the optical power converter in my present invention has several objects and advantages which are:

(a) to provide an easy to use converter that can be operated simply;

(b) a self-sufficient converter that does not need an external power source to operate, a battery pack being present in the shell, or does not need a battery when used with an Ohm-meter, which provides the operating power;

(c) an optical power converter that can be plugged directly into an ordinary multi-meter thereby eliminating the need for external cable to connect to a volt-meter or other voltage acquisition system;

(d) an optical fiber connection port that allows a wide variety of fiber diameters and eliminates the need for a 90° precise placing of the fiber during measurement, thereby speeding the operation of switching from one optical fiber to another;

(e) an optical power converter that is low cost relatively to other systems because it eliminates the need for an especially built apparatus, by simply plugging onto a multi-meter that costs a fraction of the price of a special apparatus;

(f) an optical power converter that is lightweight and can be fitted with different configurations so as to expand its field of use.

Still further objects and advantages will become apparent from a consideration of the ensuing description and drawings.

DRAWING FIGURES

In the drawings, closely related figures have the same number but different alphabetic suffixes. Reference numerals are used to differentiate components of the present invention.

DESCRIPTION

Figure 1:
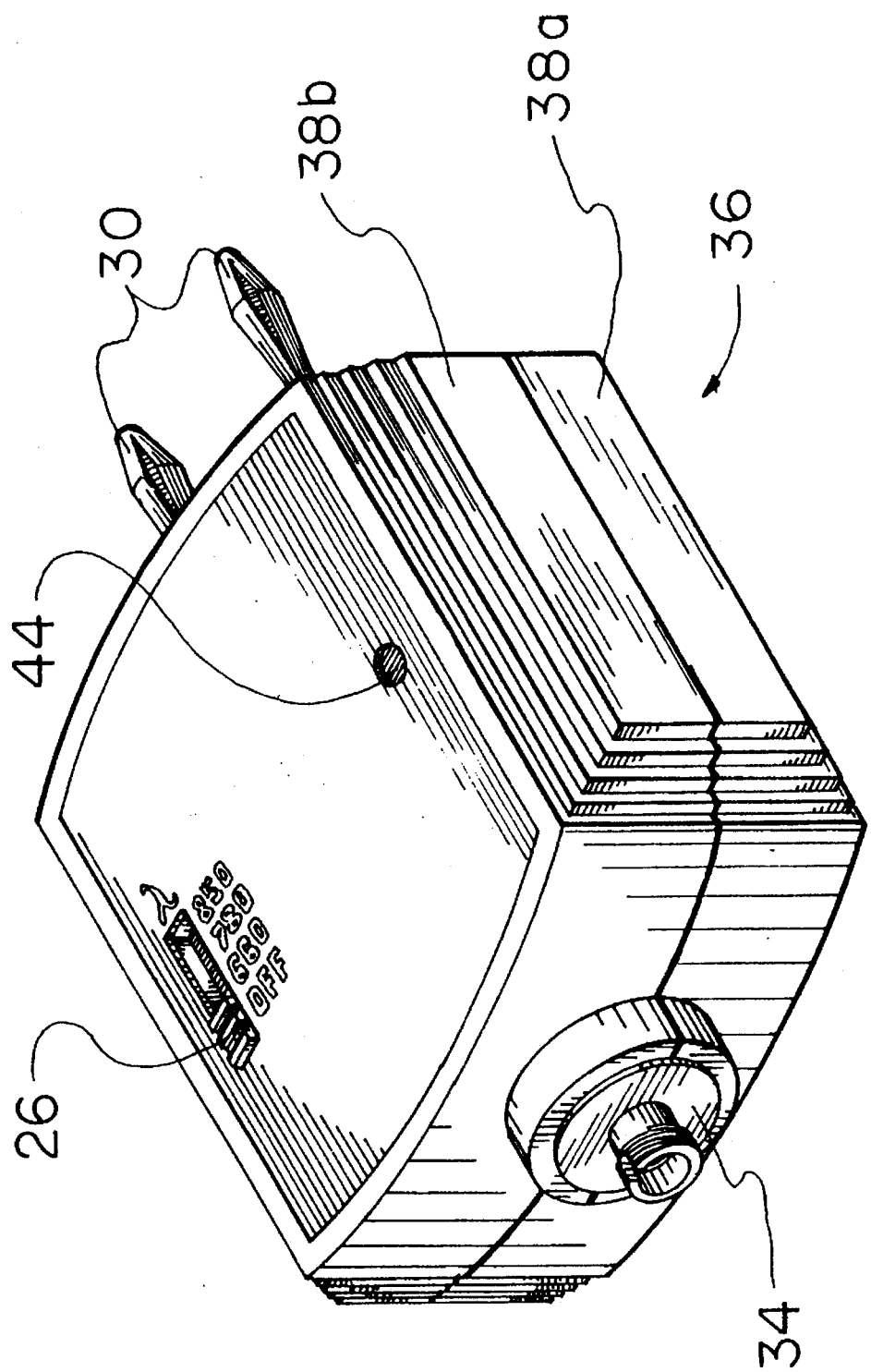
FIG. 1 is a general view, in perspective, of the converter.
Figure 2A:
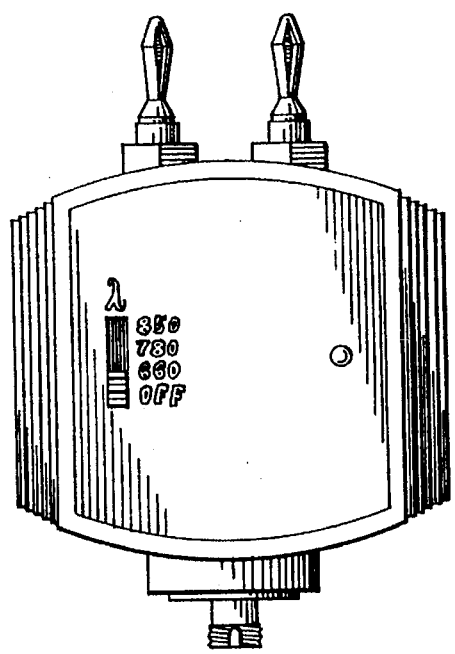
FIGS. 2A,2B,2C,2D are a top, a bottom and end views of the converter of FIG. 1.
Figure 2B:
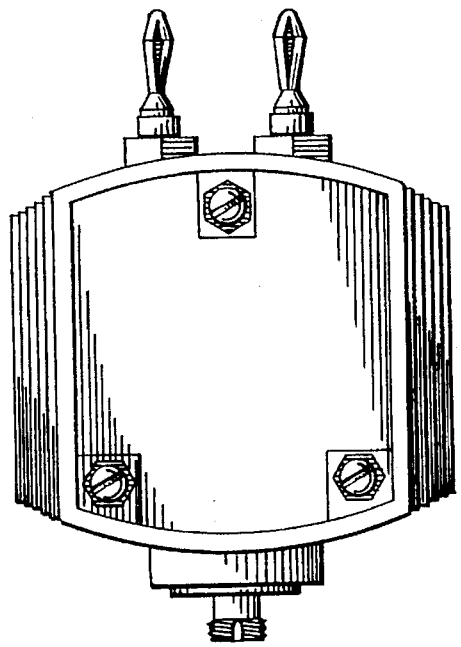
Figure 2C:
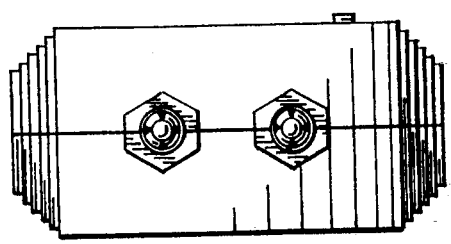
Figure 2D:
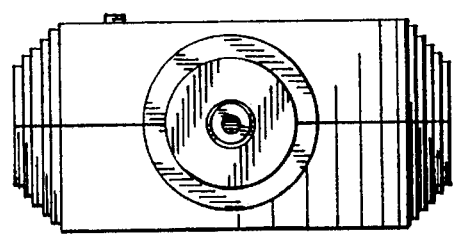
Figure 3:
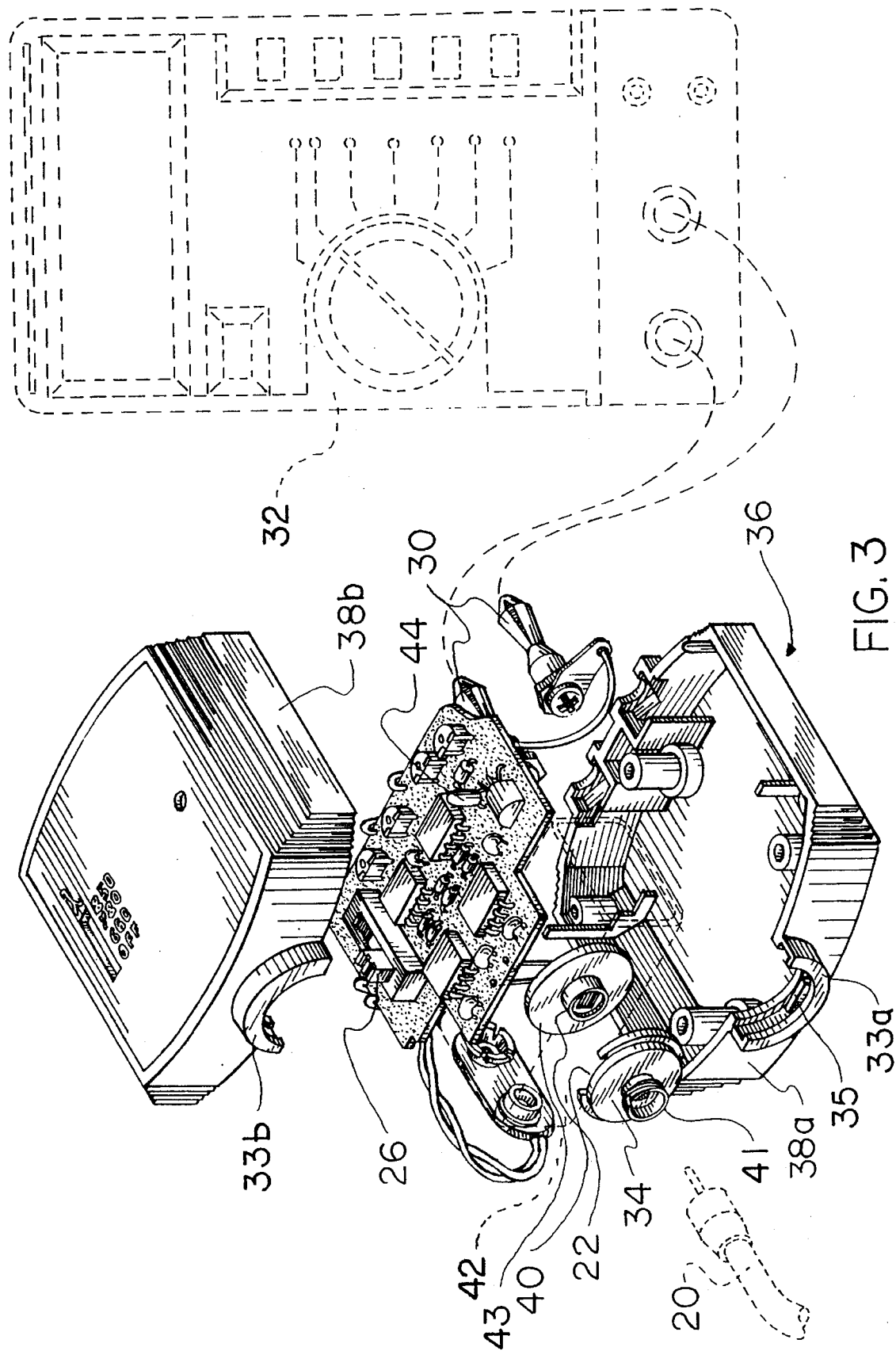
FIG. 3 is an exploded view thereof and in dotted line, an optical fiber and a multi-meter.
Figure 4:
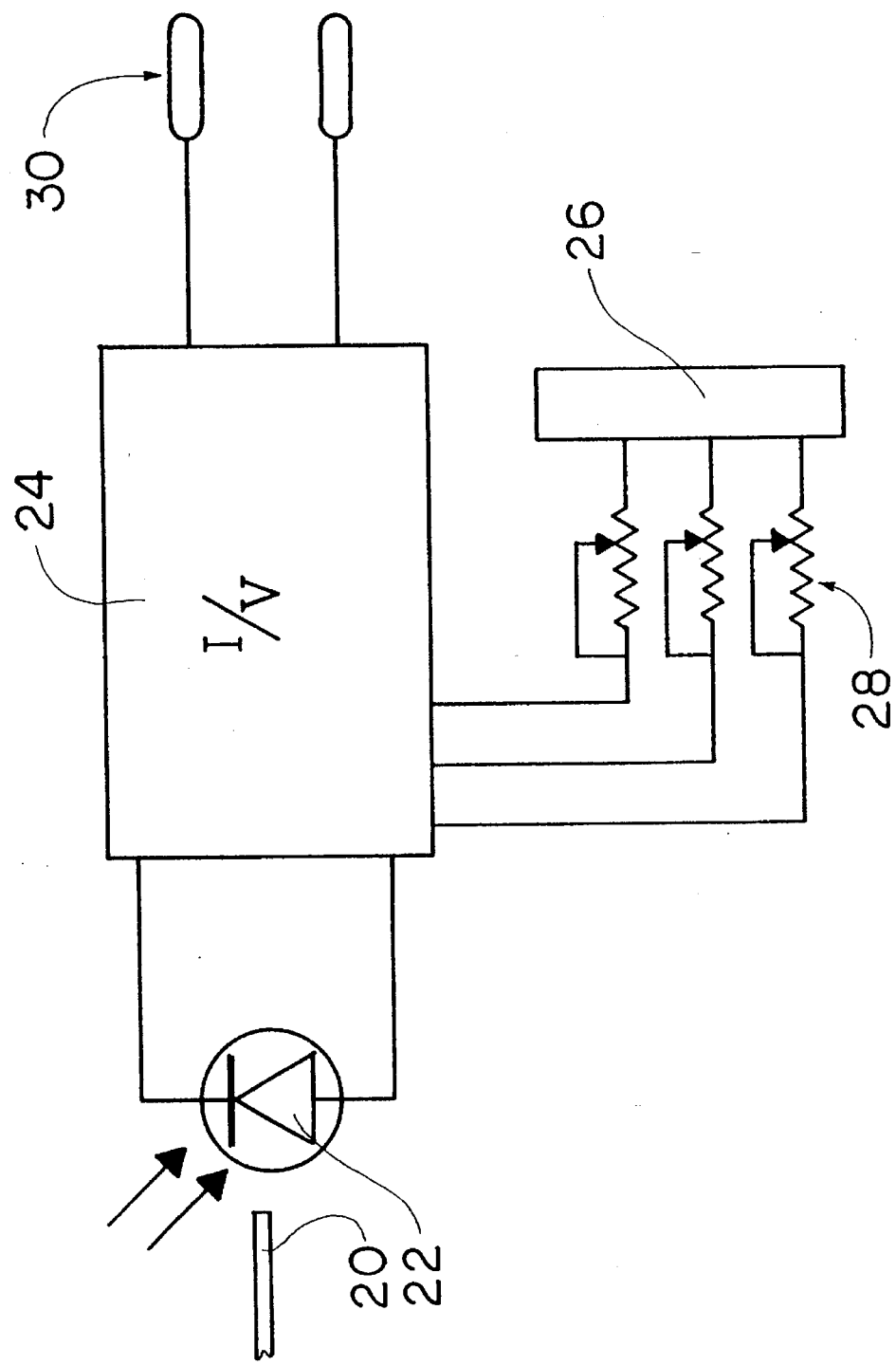
FIG. 4 is a simplified circuit diagram of the converter.
Figure 5:
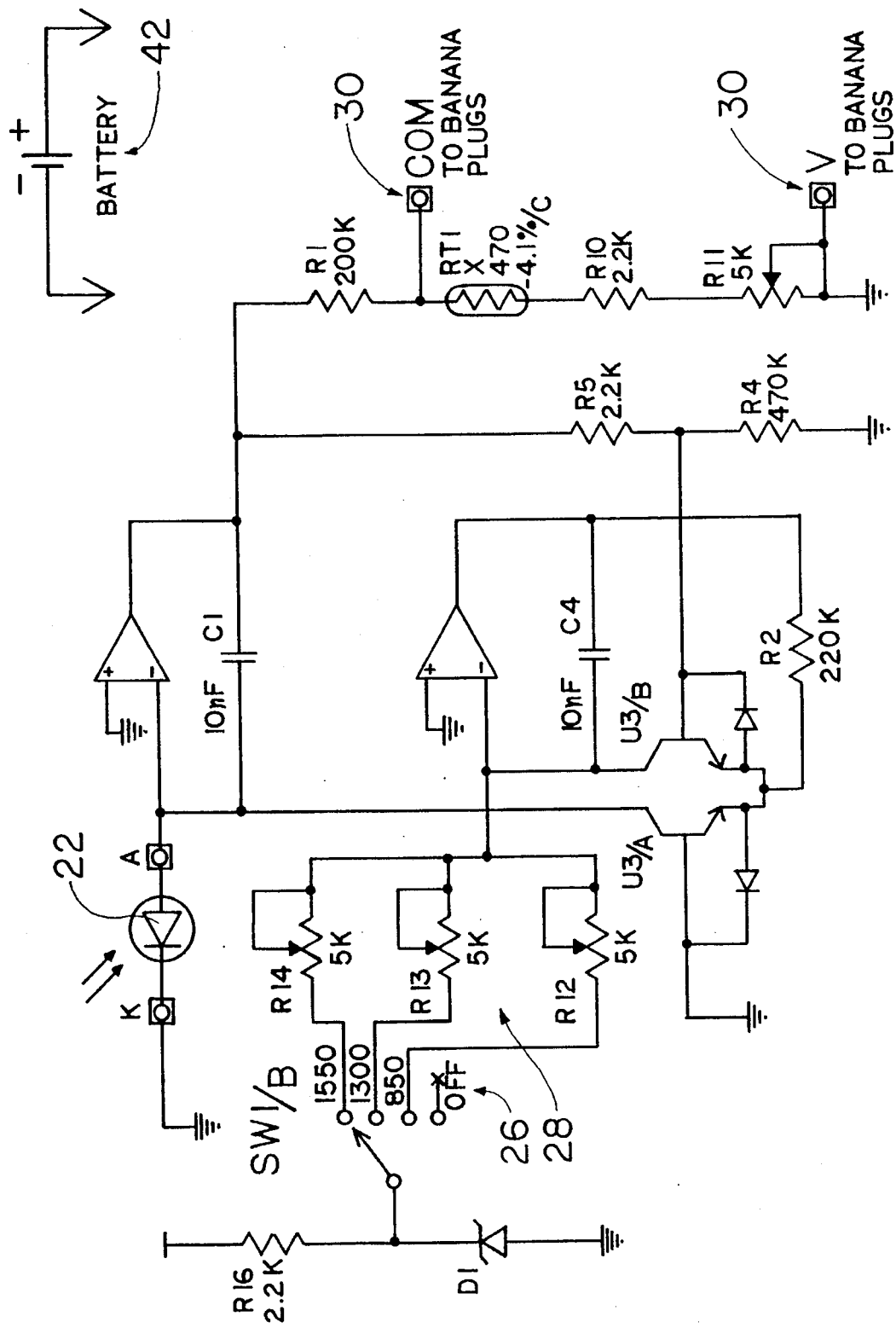
FIG. 5 is a circuit diagram of a first embodiment.
Figure 6:
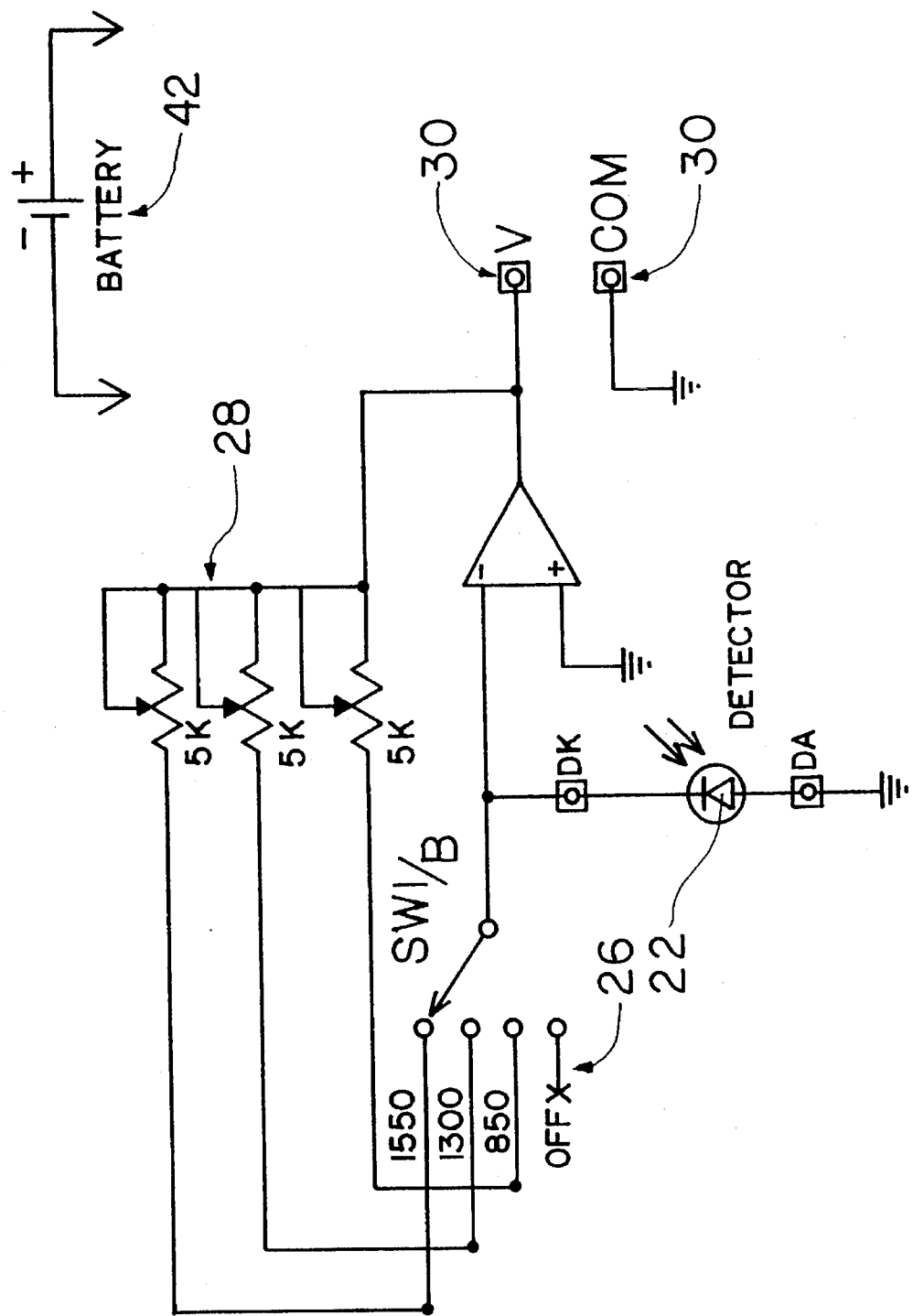
FIG. 6 is a circuit diagram of a second embodiment.

A typical embodiment of the present invention is illustrated in FIG. 4 where one can see: an optical fiber 20 which is connected to a photo-diode 22 by means later described. The photo-diode 22 is connected in turn to an I/V converter 24 that can be operated in a LOG or LINEAR mode depending on the application. LOG mode will usually be used in telecommunication and LINEAR mode in laboratories or in university classes. The I/V converter 24 is calibrated by a switch 26 that operates the adjustment 28 for wavelength calibration potentiometers. This adjustment 28 possesses three settings which are the most used wavelengths in the Industry so as to give a reference wavelength to the I/V converter 24 when it measures the optical power output in the optical fiber 20. Typical values in the visible range are 660, 780 and 850 nM and in the infrared range 850, 1300 and 1550 nM. Finally the I/V converter 24 is connected to banana plugs 30 which can be plugged directly in a multi-meter 32—FIG. 3—for quick and easy reading of the values measured and therefore converting the multi-meter into a power-meter. The optical fiber 20 is connected by an optical fiber adaptor 34—FIG. 3—that can be removed from the converter casing 36 simply by opening the two halves 38a and 38b of the converter casing 36 and, with the help of a groove 40, slides over the photo-diode 22 making this piece of the apparatus easy and cheap to manufacture, contrary to the same components on other systems because it has no threads. It is inserted only with the help of the groove 40. The photo-diode 22 possesses a large measuring surface that eliminates the need to always have the fiber light beam at a perfect 90° angle all the time, and costly manufactured aligning apparatus. In two of the embodiments shown here, mainly—FIG. 5—and—FIG. 6—, the power to operate the converter is provided by a battery 42 placed inside the converter casing 36—FIG. 3—making the apparatus self sufficient, not needing the help of external power sources. A battery check diode 44 tells the operator when to change the battery 42.

Figure 7:
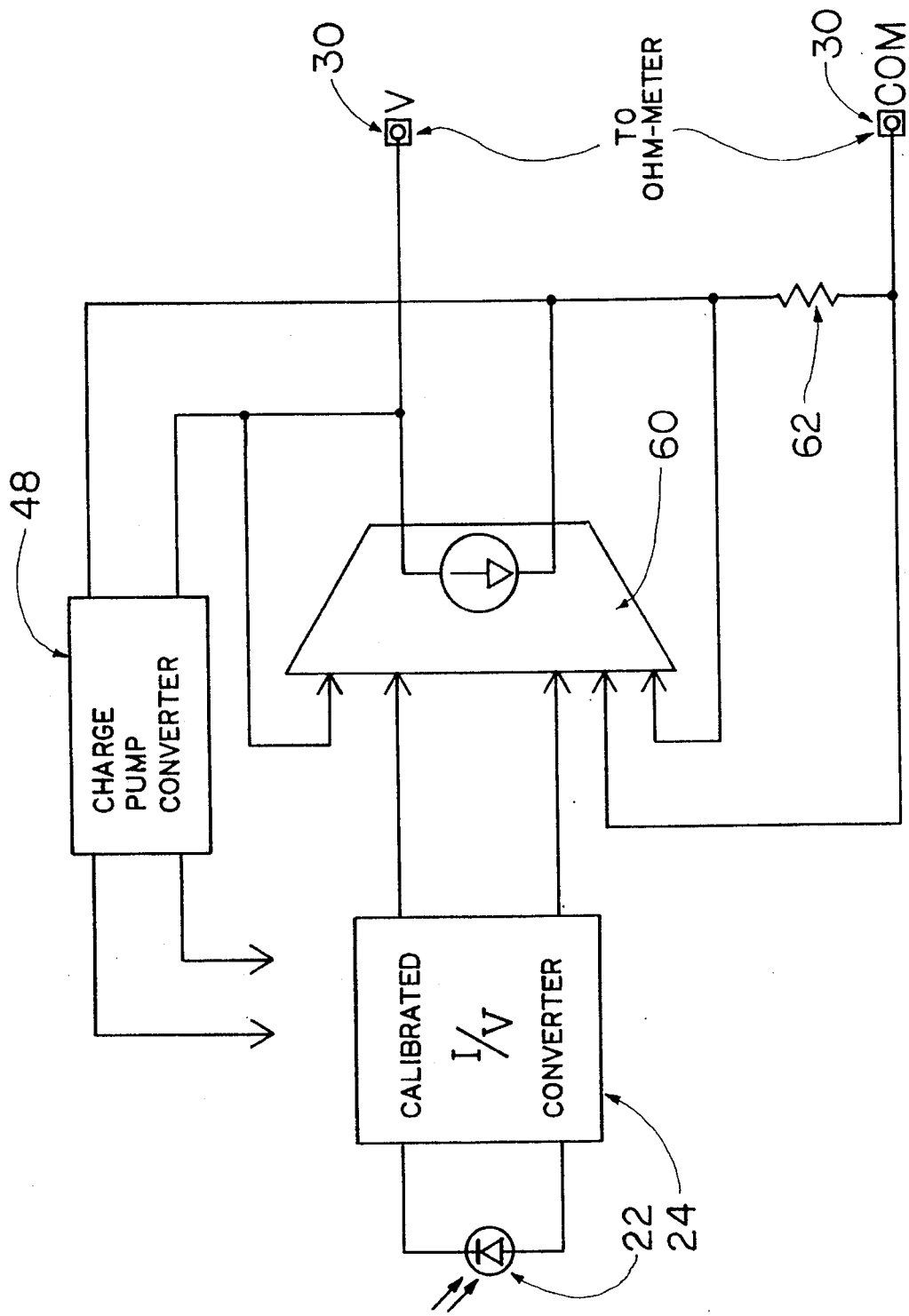
FIG. 7 is a diagram of a third embodiment, used with an Ohm-meter.

The third embodiment of the invention—FIG. 7—does not need any power to operate since, as one can see, the invention is plugged on an Ohm-meter that is used to measure the Ohm value of a resistance by sending a current into a circuit and measuring the output voltage from the current. The invention has in this case, a Feedback controlled current source (FCCS) 60 and a charge pump converter 48; the latter takes a bit of power from the Omh-meter power input in the circuit and allocates it to the operation of the calibrated I/V converter 24 and the FCCS 60. The FCCS generates a current that makes the total current value measured at the current sensing resistor 62, the right value. That value assures a true Ohm measurement corresponding to the optical power generated in the photo-diode 22 and the I/V converter 24. The FCCS 60 also takes in account the voltage present at the Ohm-meter connections and then compares that value with the one received from the converter 22 and with a comparison chart measures the optical power and therefore translates it into Ohms.

Basic circuitry design is present in every embodiment described and differs only in some area. To use in a visible optical power mode, the photo-diode 22 is silicon based as for infrared optical power mode, the photo-diode 22 is germanium based and every optical power to voltage converter can be provided in LINEAR or LOG mode depending on the user.

A general objective is to supply an apparatus comprising:

(a) a housing comprising a connecting area, (b) a pair of male connectors mounted in spaced apart relationship and protruding from the housing to be received by spaced apart female connectors of a meter, (c) for connection to an optical cable comprising a sheath and an optical fiber, an adaptor adapted to receive and align the end of an optical fiber to face the photo-detector, the adaptor comprising means to maintain the end in a spaced relationship with the photo-detector, (d) a photo-detector mounted in the housing to receive light from the optical cable and further comprising means for converting an outut signal of the photo-detector to a signal value compatible for display by the meter, (e) calibration means, connected between the photo-detector and the male connectors for providing a calibrated power response signal proportional to an intensity of the light received, comprising:

a number of potentiometers corresponding to certain reference wavelengths and a switch to select one of the reference wavelengths used during the testing of the optical power.

As first means for holding the photo-detector in place in front of the optical fiber, there is provided a first washer disposed circumferentially of the photo-detector and attached a certain distance from the surface of the photo-detector, the first washer adapted to be housed in the connecting area of the housing.

The adaptor comprises:

a central channel to allow the passage of the optical fiber to the photo-detector, second means for holding the sheath coaxially with the channel, a second washer adapted perpendicularly of the channel and joined to the second means for holding, a flange fixed to the second washer and of the same thickness as the certain distance, the flange adapted to rest flat against the first washer and to rest radially within the connecting area, the flange comprising a diametral groove of a width of a size equivalent to the outside dimension of the photo-detector and adapted to be housed in the connecting area of the housing.

The housing comprises two half shells having a bottom part; the connecting area of the housing comprises:

a second groove to adapt the first washer, a third groove to adapt the flange and comprising a protrusion located on the bottom part of each half shell, the protrusion to be positioned in the first groove along with the photo-detector thereby serving to limit the rotation of the adaptor to keep the optical cable from twisting. What is seen in FIG. 3 is a half neck 33a attached to half shell 38a with a corresponding half neck 33b attached to half shell 38b. A lug 35 serves to align the opening of a groove 40 in fiber adaptor 34, a photo-diode first flange 43 is attached to the back of photo-diode 22; a second flange is attached to fiber adaptor 34 on a face facing the photo-diode 22 such that photo-diode 22 may slide in groove 40. A channel 41 for receiving optical fiber 20 is located centrally to fiber adaptor 34. The flanges are set on either part of the half necks 33a and 33b in FIG. 3 and the channel 41 serves for directing alignment of optical fiber 20 with photo-diode 22.

It is also possible to provide an apparatus for mounting an optical fiber to a meter for power output display, the optical fiber comprising a sheath and an end carrying optical power, the apparatus comprising:

a connecting area located within the apparatus, a photo-detector, an adaptor adapted to receive and align the optical fiber to face the photo-detector, calibration means comprising a wavelength reference.

Although particular embodiments of the invention have been described in detail, it should be appreciated that numerous modifications, variations, and adaptations may be made thereto without departing from the scope of the invention as defined in the appended claims.

PARTS LIST

20. Optical fiber
22. Photo-diode
24. I/V converter
26. Switch

28. Adjustment
30. Banana plugs
32. Multi-meter
33a. Half neck
33b. Half neck
34. Fiber adaptor
35. Lug
36. Casing
38a. Casing half
38b. Casing half
40. Groove
42. Battery
43. Photo-diode first flange
44. Battery check diode
48. Charge pump converter
60. Feedback controlled current source
62. Current sensing resistor

I claim:

1. An apparatus for use in conversion of an optical power having a certain wavelength, said apparatus comprising:
   (a) a housing comprising a connecting area,
   (b) a pair of male connectors mounted in spaced apart relationship and protruding from said housing to be received by spaced apart female connectors of a meter,
   (c) means provided in said housing for connection to an optical cable, comprising a sheath and an optical fiber,
   (d) a photo-detector mounted in said housing to receive light from said optical cable and further comprising means for converting an output signal of said photo-detector to a signal value compatible for display by said meter,
   (e) calibration means connected between said photo-detector and said male connectors for providing a calibrated power response signal proportional to an intensity of said light received.

2. An apparatus as defined in claim 1 wherein said photo-detector comprises a photo-diode having a receiving surface.

3. An apparatus as defined in claim 2 wherein said receiving surface is large relative to the area of said optical fiber, to allow the optical fiber to be tested at an angle near 90° with said receiving surface when tested.

4. An apparatus as defined in claim 2 wherein said means for converting said output signal comprises an I/V converter following said photo-diode.

5. An apparatus as defined in claim 4 wherein said means for converting said output signal comprises a LOG amplifier connected between said photo-diode and said male connectors.

6. An apparatus as defined in claim 4 wherein said means for converting said output signal comprises a LINEAR amplifier connected between said photo-diode and said male connectors.

7. An apparatus as defined in claim 1 wherein said male connectors comprise two banana plugs mounted on said housing of said apparatus and adapted to be plugged and used with a multi-meter having a receiver terminal for said banana plugs.

8. An apparatus as defined in claim 1 wherein said calibration means comprise a number of potientiometers corresponding to certain reference wavelengths and a switch to select one of said reference wavelengths used during the testing of said optical power.

9. An apparatus as defined in claim 4 wherein said I/V converter is powered by a battery located within said housing.

10. An apparatus as defined in claim 4 where said I/V converter, when used with an Ohm-meter, is powered by the power source of said Ohm-meter.

* * * * *